United States Patent [19]

Chisholm

[11] Patent Number: 5,177,346
[45] Date of Patent: Jan. 5, 1993

[54] BAR CODE READER SYSTEM FOR READING BAR CODE LABELS WITH A HIGHLY SPECULAR AND LOW CONTRAST SURFACE

[75] Inventor: Thomas J. Chisholm, Milton, Mass.

[73] Assignee: Computer Identics, Milton, Mass.

[21] Appl. No.: 450,243

[22] Filed: Dec. 13, 1989

[51] Int. Cl.[5] .......................... G06K 7/10; G02F 1/01; H01J 40/14

[52] U.S. Cl. ................................. 235/462; 235/470; 250/225; 250/568

[58] Field of Search ....................... 235/454, 470, 462; 369/110; 250/225, 568, 566

[56] References Cited

U.S. PATENT DOCUMENTS

| | | | |
|---|---|---|---|
| 3,790,286 | 2/1974 | Kraus | 250/225 |
| 3,801,182 | 4/1974 | Jones | 250/225 |
| 3,812,374 | 5/1974 | Tuhro | 235/462 |
| 3,849,632 | 11/1974 | Eckert, Jr. et al. | 235/463 |
| 3,949,233 | 4/1976 | Gluck | 235/462 |
| 4,532,619 | 7/1985 | Sugiyama et al. | 369/110 |
| 4,603,262 | 7/1986 | Eastman et al. | 235/472 |
| 4,652,750 | 3/1987 | Eastman et al. | 235/472 |
| 4,729,122 | 3/1988 | Itoh | 369/110 |
| 4,740,675 | 4/1988 | Brosnan et al. | 235/462 |

Primary Examiner—Eugene R. LaRoche
Assistant Examiner—Christopher R. Glembocki
Attorney, Agent, or Firm—Iandiorio & Dingman

[57] ABSTRACT

A bar code reader system for reading bar code labels with highly specular spaces and bars with low contrast. The bar code label is illuminated with radiation polarized in a first direction. The radiation polarized in a first direction reflected from the bar code label is received and blocked by means of cross polarization. This blocked radiation is representative of the spaces and other radiation passing through unblocked is representative of the bars. The resulting radiation pattern representative of the bars and spaces is consequently inverted from its initial state into a secondary state. The radiation image passed by the block is detected in order to generate a signal representative of the bars and spaces. The strength of the signal representing the spaces is substantially diminished in intensity. The widths of the areas representing the bars and spaces is determined, and the widths representing the bars and spaces are interpreted to obtain the information of the bar code.

10 Claims, 3 Drawing Sheets

BAR CODE READER SYSTEM FOR READING BAR CODE LABELS WITH A HIGHLY SPECULAR AND LOW CONTRAST SURFACE

FIELD OF INVENTION

This invention relates to an improved bar code reader system for reading bar code labels appearing on highly specular surfaces with spaces or bars of high specularity and bars or spaces of low contrast.

BACKGROUND OF INVENTION

Raw silicon wafers used in the production of integrated circuits begin production as simple circular disks of relatively low value. After a series of production operations required to produce a complete integrated circuit logic chip on the wafer, the wafer becomes significantly more valuable, as much as 300 to 400 times as valuable (up to $18,000) as the initial silicon wafer (only about $50). Throughout the operation of production, wafers are sorted and separated on the basis of quality: the higher quality units are isolated to be used for higher reliability devices while lesser quality units become marked for other utilizations. A complex categorization system is employed to correctly determine the quality of individual silicon wafers, such that an automated tracking system for these wafers is preferred to human controlled tracking. A bar code system may be utilized to effect automatic tracking of items in production; however, in the case of silicon wafers, the highly specular nature of the wafers causes great difficulty with a standard bar code reading and detecting system. The specular surface of the wafer reflects such a strong signal to the bar code detector, that the bar code information reader is overwhelmed by signal strength. So much light is reflected from the spaces between the bars that are etched on a silicon wafer that the signals from the bar code segments themselves are overwhelmed. This results when the amplifier within the detector is driven into saturation by the large amount of light contained in the spaces between bars and cannot recover quickly enough from each saturation to read accurately the bar information between the spaces.

One possible approach to solving the problem is to angle the silicon wafer slightly such that the majority of the reflected light does not return to the detector. However one problem with this approach is that very slight variations in the specularity of the surface of successive wafers, or in the angle in which they are read, cause major differences in the amount of light transmitted to the detector. Further, the vast majority (up to 99%) of the light reflected from the specular surface is purely reflected rather than defracted. Thus, the remaining defracted light that would return from an angled surface is very weak and difficult to discern from the also weak signal defracted from the bars of the bar code. As a result, there is little contrast between a space and a bar. Therefore, the rate of accuracy in reading wafers in this manner can be as low as 8%.

Suppression of specular reflection in bar code reading was addressed in U.S. Pat. No. 3,812,374 by Tuhro, "Specular Reflection Suppression Apparatus", and assigned to the instant assignee. In that patent, cross polarization is used to eliminate glare caused by specular reflection from glossy films placed over the bars and spaces. In the case of Tuhro, the problem is a glossy specular film covering both bars and spaces. However, in the case of silicon wafers the spaces are highly specular, but the bars are significantly less so.

SUMMARY OF INVENTION

Is therefore an object of this invention to provide an improved highly reliable bar code reading system for silicon wafers.

It is a further object of this invention to provide such a system which produces improved signal to noise ratios in an environment where the spaces of the bar code are highly specular when compared to the bars.

It is a further object of this invention to provide such a system that results in a high differential between the bar and space signals.

It is a further object of this invention to provide such a system that eliminates saturation of the system by specular reflection.

It is a further object of this invention to provide such a system in which normal variations in specularity and angle of incidence of the wafer do not substantially effect the bar code signal.

This invention results from the realization that a truly effective bar code reader system for highly specular surfaces such as those found on silicon wafers can be effected by the utilization of cross polarization to virtually entirely suppress specular reflection of the spaces in a bar code and by applying high gain amplification to enhance the signal representation of the bars and then, if necessary, by inverting this signal to be read by the decoding system.

This invention features an improved bar code reader system for reading bar codes labels with highly specular spaces and bars of low contrast comprising means for illuminating a bar code label with radiation polarized in a first direction. There are means for receiving radiation in a primary state as it is reflected from the bar code labels including means for blocking radiation polarized in the first direction, representative of the spaces, and passing other radiation, representative of the bars, resulting in a radiation pattern in which the representation of the bars and spaces is inverted into a secondary state. There are means for detecting the radiation image, passed by the means for blocking, for generating a signal representative of the bars and spaces with the strength of the signal representing the highly specular spaces substantially diminished. There are means for determining the width of the areas representing the bars and representing the spaces, and finally, means for interpreting the widths representative of the bars and spaces to obtain the information contained in the bar code. In a preferred embodiment, the means for detecting may include amplifier means for amplifying the signal in its secondary state to increase the contrast between spaces and bars. The means for detecting may further include analog to digital converter means for converting said signal in its secondary state from an analog signal to a digital signal. The means for detecting may also include inverter means to return the value of said digital signal from a value corresponding to the secondary state back to a value corresponding to the primary state. The means for determining the width may include bar timing logic circuit means to convert the digital signal from the means for detecting to a series of numerical values. The means for interpreting the widths may include a decoder circuit to convert the numerical values from the means for determining the width to a readable code representative of the item to bar coded. The bar timing logic circuit may include inverter means to reverse the values of the digital signal from a value corresponding to the secondary state back to a value corresponding to the primary state. The means for illuminating include polarized laser beam means and may include means for polarizing radiation linearly or circularly.

DISCLOSURE OF PREFERRED EMBODIMENT

Other objects, features and advantages will occur to those skilled in the art from the following description of a preferred embodiment and the accompanying drawings, in which.

Figure 1:
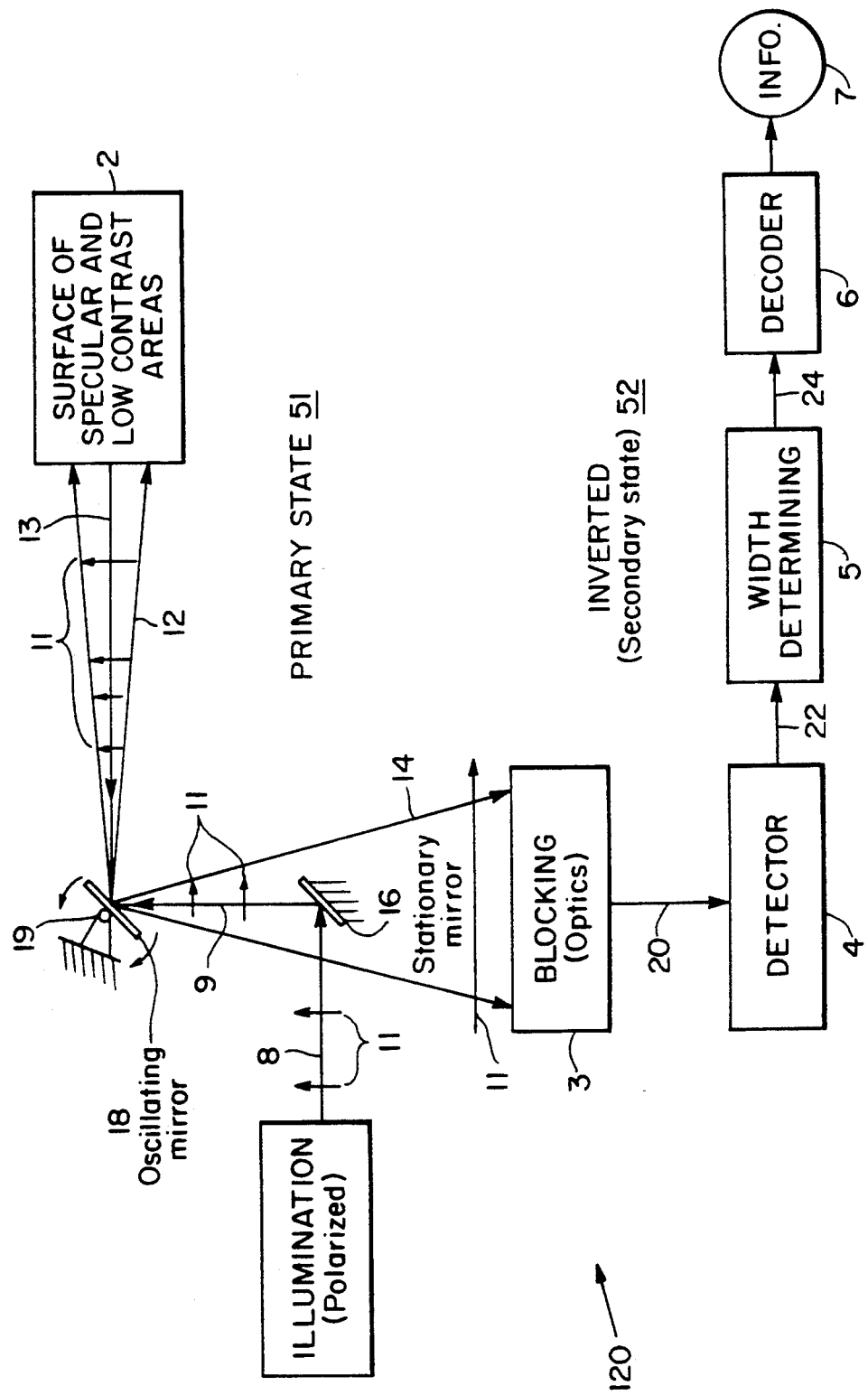
FIG. 1 is a block diagram of an improved bar code reading system according to this invention.

There is shown in FIG. 1 a block diagram of an improved bar code reading system 120 according to this invention consisting of a polarized radiation source 1, a stationary mirror 16, an oscillating mirror 18, an object with alternately specular and low contrast areas 2, optics 3 to block polarized radiation 14, a light detector 4 with electrical output signal 22, a circuit 5 to determine width of signal 22 and a decoder 6 to output information 7 from a given input width signal 26.

Polarized radiation 8, emitted from illumination source 1 shown polarized linearly in direction 11 is reflected by stationary mirror 16 to a 90 degree angle from incident. The reflected radiation 9 is then again reflected 90 degrees from incident, to proceed in approximately the same angular direction as its initial path from the source, by oscillating mirror 18. This oscillating mirror is mechanically driven at a constant frequency about a pivot point 19. This reflected radiation 12 will oscillate at a fixed frequency through a central path as a result of the movement of the mirror, such that when it strikes the surface of specular and low contrast areas 2 it crosses between these areas reflecting back an alternating time dependent pattern of high and low radiation 13 corresponding to whether the area crossed is of high specularity or low contrast. The output of reflected radiation is very high for an area of high specularity and very low from an area of low contrast. Both polarized and diffracted radiation result from reflection on surface 2, but the polarized radiation will be orders of magnitude stronger, particularly where radiation has been reflected from a specular area of the surface. This radiation pattern 13 is again reflected by oscillating mirror 18 to an angle approximately 90 degrees from incident. The resulting time dependent radiation pattern 14 is wide enough that the interceding stationary mirror 16 does not substantially interfere with the pattern composition when it reaches optics 3 which block any polarized radiation. Before blocking, the radiation pattern is in a primary state 51 such that specular areas result in a very high reflected radiation output while low contrast areas result in a low radiation output. Subsequent to blocking, the radiation pattern 20 assumes secondary state 52 in which all polarized radiation is eliminated and, thus only diffracted and non-polarized radiation passes through. The result is a pattern inverted from the primary state since very little diffracted and non-polarized radiation is reflected from specular areas, while substantially more of this diffracted and non-polarized radiation is reflected from the low contrast areas. The result, on a relative scale, is a high radiation output for low contrast areas and a low output for highly specular areas.

This inverted pattern 20 enters radiation detector 4 which converts the radiation into a corresponding electrical signal 22 which is transmitted to width determining circuit 5. This circuit translates the detector signal 22 into a signal representative of given widths of low contrast and highly specular areas 24. This width signal 24 is in turn transmitted to decoder 6 which performs a predetermined algorithm in order to produce the information 7 to be obtained from scanning the surface.

Figure 2:
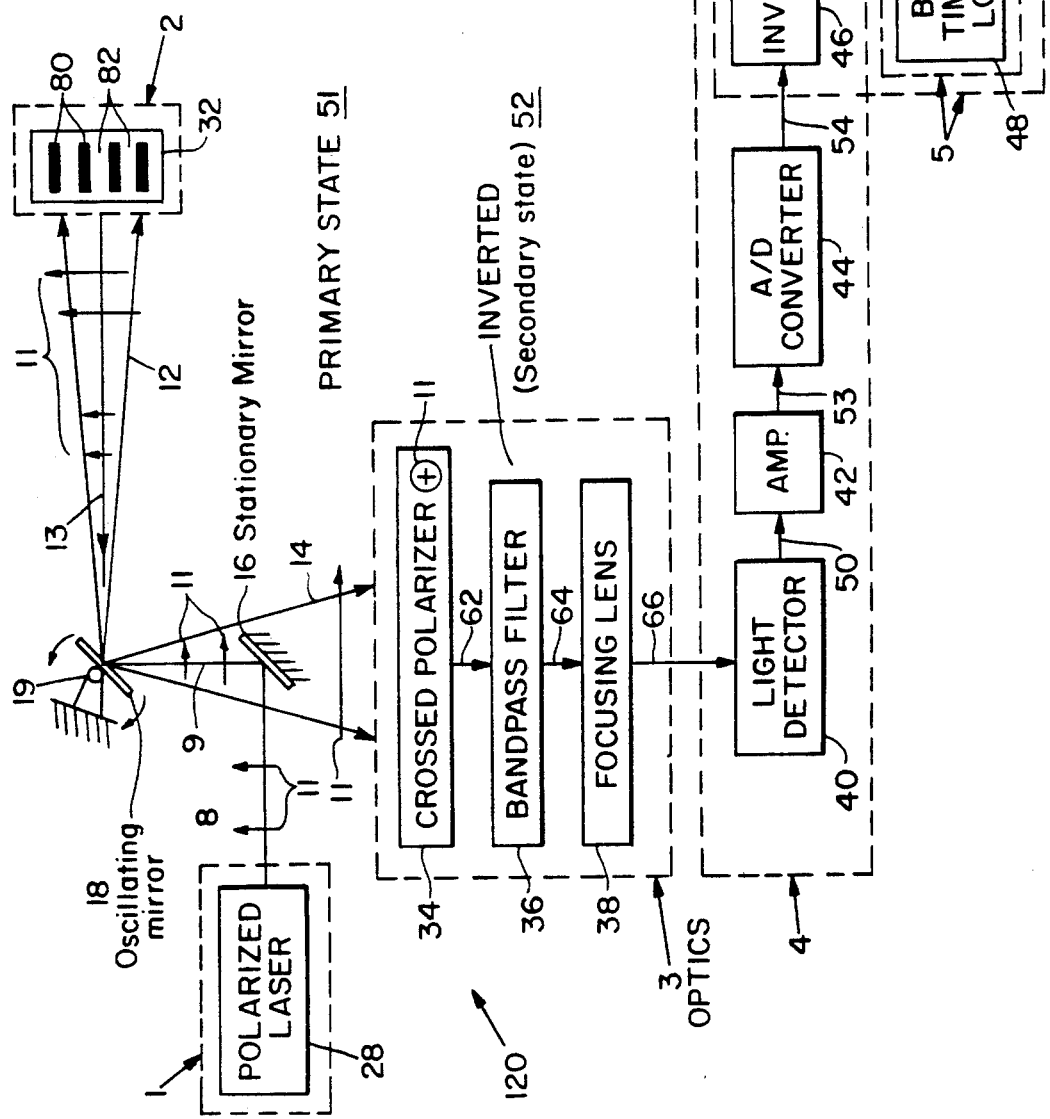
FIG. 2 is a more detailed diagram of the system of FIG. 1.

FIG. 2 shows a more detailed block diagram of the device in FIG. 1, that includes a polarized laser 28 as the illumination source. The polarized light from the laser 28 is reflected by mirrors 16 and 18 to cross at a fixed frequency a highly specular and low contrast surface now specifically in the form of a bar code 32 with alternating segments of high specularity 82 and low contrast 80. Either bars or spaces may be of high specularity and either spaces or bars may be of low contrast as long as some alternating pattern of highly specular and low contrast segments is present. The light pattern returned from the scanned bar code (now a time dependent high-low signal of light) is reflected back to oscillating mirror 18 which turns it approximately 90 degrees to where it is received by optical components making up the blocking system 3, now shown in more detail. The light first enters a crossed polarizer 34 which allows only non-polarized light 62 to pass through. It is important that the entry opening of the crossed polarizer be sufficiently large to prevent the oscillating mirror from angling the return polarized light 14 away from the opening at any time. Non-polarized light 62 is now passed through a band pass filter 36 which attenuates the wavelengths allowed to pass, thus, blocking all unwanted refracted light and external background radiation. The filtered light 64 is now focused by a focusing lens 38. The focused beam of light 66 is received by a detector 40 which may be a pin diode. The detector, in response to the light, produces a corresponding analog electrical signal 50 of alternating positive and negative voltage that is amplified by amplifier 42 to increase the contrast between high and low output values and also to place the signal entirely in the positive voltage range. This amplified signal 53 is received by an analog to digital converter 44 that creates a corresponding digital signal 54 in which the high and low output analog values are assigned a time dependent high or low digital voltage. High analog value may correspond with high digital value and low analog with low digital or vice versa. This digital signal is then inverted by inverter 46 to return the signal value to a primary state corresponding to the light signal reflected by the bar code 32. This inverted signal 56 is then transmitted to the bar timing logic circuit 48 which determines standard width values for the segments 80 that comprise the bar code 32.

The inverter function performed by inverter 46 may be combined in the bar timing logic circuit to create a single function circuit 70. However, performing the inversion separately would be preferred since a standard commercially available bar timing logic circuit could then be employed. The signal of width values 24 is then transmitted to decoder 6 where these width values are translated into bar code information 7.

Figure 3:
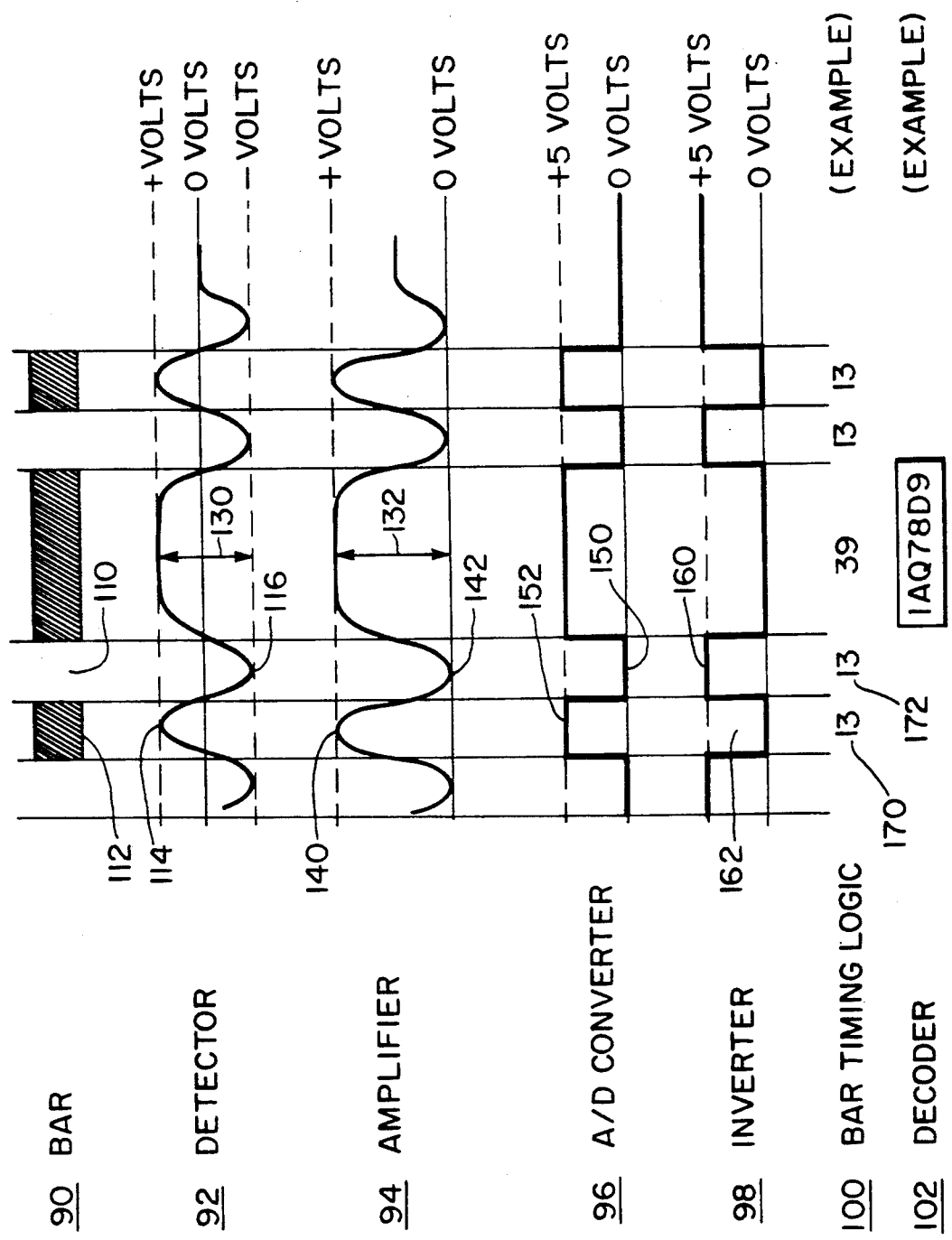
FIG. 3 is a timing diagram of the bar code signal at various points in the system of FIG. 2.

FIG. 3 represents an example of the signal timing state at various stages of output within the device. A depiction of a bar code 90 is shown in which alternating light and dark areas represent corresponding areas of high specularity 110 and low contrast 112. In this example the depiction of detector output 92 shows a high output signal from the detector 114 in response to an area of low contrast. This detector signal output may be reversed, that is, low output for low contrast and high for high. It is important only that for any given highly specular or low contrast area, a corresponding high or low signal be consistently generated by the detector.

The detector signal 92 is amplified into amplifier signal 94 in which the voltage is brought completely into the positive range and overall signal amplitude for the amplified signal 132 is greater than the detector signal amplitude 130.

The amplified signal 94 is transmitted to an analog to digital converter to produce a digital signal 96. In this example a high output analog signal 140 corresponds to a high +5 volt digital signal 152 while a low output analog signal 142 corresponds to a low (approximately) 0 volt digital signal 150. The digital output signal 96 of the analog to digital converter is then inverted to take into account the requirement to return the signal to a primary state corresponding to the light reflected from the bar code segments, thus producing inverted signal 98. The high +5 volts output of the inverted signal 160 corresponds to a low (approximately) 0 volt signal of the analog to digital converter output signal. Conversely, the low (approximately) 0 volt inverted signal 162 corresponds to a high +5 volt analog to digital converter output signal 152.

This inverted signal 98 is transmitted to the bar timing logic circuit which assigns a series of numerical widths 170, 172 to alternating high and low digital signals on the basis of time.

The series of numerical widths 100 is transmitted to the decoder to produce the information of the bar code 102.

Although specific features of the invention are shown in some drawings and not others, this is for convenience only as each feature may be combined with any or all of the other features in accordance with the invention. Other embodiments will occur to those skilled in the art and are within the following claims:

What is claimed is:

1. An improved bar code reader system for reading bar codes with bars of low contrast and highly specular spaces where the width of the areas representing the bars and spaces are representative of information for an item bar coded, comprising:

means for illuminating a bar code label on the item with radiation polarized in a first direction;

means for receiving radiation in a primary state as it is reflected from said bar code wherein radiation received from the high reflectivity spaces is polarized in the first direction and radiation received from the low reflectivity bars is depolarized, thereby creating a high radiation output for spaces and a low radiation output for bars;

means for converting received radiation to a secondary state by blocking radiation polarized in said first direction representative of said spaces and allowing to pass other radiation representative of said bars, resulting in a radiation pattern wherein the radiation output from spaces is lower than the radiation output from bars;

means for detecting said radiation, passed by said means for converting received radiation, for generating a signal representative of said bars and spaces with the strength of the signal representing the highly specular spaces substantially diminished to eliminate detector component saturation;

means for converting said signal in its secondary state representative of the bars and spaces from an analog signal to a digital signal;

means to return by inversion a value of said digital signal corresponding to said secondary state back to a value corresponding to said primary state, in which the signal representing spaces is stronger than the signal representing bars;

means for determining, from said inverted signal, the width of the areas representing the bars and representing the spaces; and means for interpreting the widths representative of the bars and spaces to obtain the information contained in the bar code.

2. The bar code reader system of claim 1 in which said means for detecting includes amplifier means for amplifying said signal representative of bars and spaces in its secondary state to increase the contrast between bars and spaces.

3. The bar code reader system of claim 1 in which said means for detecting includes analog to digital converter means for converting said signal in its secondary state representative of the bars and spaces from an analog signal to a digital signal.

4. The bar code reading system of claim 3 in which said means for determining the width includes bar timing logic circuit means to convert said digital signal from said means for detecting to a series of numerical values.

5. The bar code reader system of claim 4 in which said means for interpreting includes a decoder circuit to convert said numerical value from said means for determining the width to the coded information of the item so bar coded.

6. The bar code reader system of claim 1 in which said means for illuminating the bar code includes polarized laser beam means.

7. The bar code reader system of claim 1 in which said means for illuminating the bar code includes means for polarizing radiation linearly.

8. The bar code reader system of claim 1 in which said means for illuminating the bar code includes means for polarizing radiation circularly.

9. A system for scanning a surface with alternating areas of high specularity and low contrast, the dimensions of these alternating areas being representative of information of an item so bar coded, comprising:

means for receiving radiation in a primary state as it is reflected from said surface wherein radiation received from the high specularity areas is polarized in a first direction and radiation received from the low contrast areas is depolarized, thereby creating a high radiation output for high specularity areas and a low radiation output for low contrast areas;

means for converting received radiation to a secondary state by blocking radiation polarized in said first direction representative of said high specularity areas and allowing to pass other radiation representative of said low contrast areas resulting in a radiation pattern wherein the radiation output from high specularity areas is lower than the radiation output from low contrast areas;

means for detecting said radiation, passed by said means for converting received radiation, for generating a signal representative of said alternative areas of high specularity and low contrast with the strength of the signal representing the highly specular areas substantially diminished to eliminate detector component saturation;

means for converting said signal in its secondary state representative of the high specularity and low contrast areas from an analog signal to a digital signal;

means to return by inversion a value of said digital signal corresponding to said secondary state back to a value corresponding to said primary state in which the signal representing highly specular areas is stronger than the signal representing low contrast areas;

means for determining, from said inverted signal, the width of the areas representative of said areas of high specularity and low contrast; and means for interpreting the dimensions representative of said areas of high specularity and low contrast in order to obtain the information contained therein.

10. An improved bar code reader system for reading bar codes having bar segments and space segments in which one of either bar segments or space segments are highly specular and the other are of low contrast where the width of the bar and space segments are representative of information for an item bar coded comprising:

means for illuminating a bar code label on the item with radiation polarized in a first direction;

means for receiving radiation in a primary state as it is reflected from said bar code wherein radiation received from the highly specular segments is polarized in the first direction and radiation received from the low contrast segments is depolarized, thereby creating a high radiation output for highly specular segments and a low radiation output for low contrast segments;

means for converting received radiation to a secondary state by blocking radiation polarized in said first direction representative of said highly specular segments and allowing to pass other radiation representative of said low contrast segments, resulting in a radiation pattern wherein the radiation output from highly specular segments is lower than the radiation output from low contrast segments;

means for detecting the radiation from said means for converting received radiation, for generating a bar code signal representative of said bar and space segments in a secondary state inverted with respect to said primary state with the signal representing the highly specular segments substantially reduced to eliminate detector component saturation;

means for converting said signal in its secondary state representative of the bars and spaces from an analog signal to a digital signal;

means to return by inversion a value of said digital signal corresponding to said secondary state back to a value corresponding to said primary state in which signal representing highly specular segments is stronger than the signal representing low contrast segments; and means, responsive to said bar code signal, for determining the width of said bar segments and space segments to decode said bar code.

* * * * *

UNITED STATES PATENT AND TRADEMARK OFFICE
CERTIFICATE OF CORRECTION

PATENT NO. : 5,177,346
DATED : January 5, 1993
INVENTOR(S) : Thomas J. Chisholm

It is certified that error appears in the above-indentified patent and that said Letters Patent is hereby corrected as shown below:

Title page, item [73],
Assignee's address "Computer Identics, Milton, Massachusetts" should be --Computer Indentics, Canton, Massachusetts--.

Signed and Sealed this

Twenty-sixth Day of April, 1994

Attest:

BRUCE LEHMAN

Attesting Officer    Commissioner of Patents and Trademarks